US009822247B2

(12) United States Patent
Abad

(10) Patent No.: US 9,822,247 B2
(45) Date of Patent: Nov. 21, 2017

(54) RUBBER COMPOSITION COMPRISING A POLYPHENYLENE ETHER RESIN AS PLASTICIZER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Vincent Abad, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 9 days.

(21) Appl. No.: 15/105,955

(22) PCT Filed: Dec. 19, 2014

(86) PCT No.: PCT/EP2014/078675
§ 371 (c)(1),
(2) Date: Jun. 17, 2016

(87) PCT Pub. No.: WO2015/091918
PCT Pub. Date: Jun. 25, 2015

(65) Prior Publication Data
US 2016/0319114 A1 Nov. 3, 2016

(30) Foreign Application Priority Data

Dec. 20, 2013 (FR) ..................... 13 63151

(51) Int. Cl.
| C08L 9/06 | (2006.01) |
| C08L 25/10 | (2006.01) |
| C08L 71/12 | (2006.01) |
| B60C 1/00 | (2006.01) |
| C08L 9/08 | (2006.01) |

(52) U.S. Cl.
CPC .............. *C08L 9/06* (2013.01); *B60C 1/0016* (2013.01); *C08L 71/12* (2013.01); *C08L 9/08* (2013.01); *C08L 25/10* (2013.01); *C08L 71/123* (2013.01); *C08L 71/126* (2013.01); *C08L 2205/06* (2013.01)

(58) Field of Classification Search
None
See application file for complete search history.

(56) References Cited

U.S. PATENT DOCUMENTS

| 3,383,340 | A | * | 5/1968 | Maccallum | C08L 9/06 524/370 |
| 4,588,806 | A | | 5/1986 | Aycock et al. | 528/215 |
| 5,977,238 | A | | 11/1999 | Labauze | 524/492 |
| 6,013,718 | A | | 1/2000 | Cabioch et al. | 524/506 |
| 6,503,973 | B2 | | 1/2003 | Robert et al. | 524/492 |
| 6,774,255 | B1 | | 8/2004 | Tardivat et al. | 556/427 |
| 6,815,473 | B2 | | 11/2004 | Robert et al. | 523/215 |
| 7,217,751 | B2 | | 5/2007 | Durel et al. | 524/262 |
| 7,250,463 | B2 | | 7/2007 | Durel et al. | 524/492 |
| 7,300,970 | B2 | | 11/2007 | Durel et al. | 524/493 |
| 7,312,264 | B2 | | 12/2007 | Gandon-Pain | 524/236 |
| 7,488,768 | B2 | | 2/2009 | Tardivat et al. | 524/262 |
| 7,491,767 | B2 | | 2/2009 | Durel et al. | 524/493 |
| 7,820,771 | B2 | | 10/2010 | Lapra et al. | 525/479 |
| 7,825,183 | B2 | | 11/2010 | Robert et al. | 524/476 |
| 7,834,074 | B2 | | 11/2010 | Brunelet et al. | 524/318 |
| 7,882,874 | B2 | | 2/2011 | Robert et al. | 152/209.1 |
| 8,324,310 | B2 | | 12/2012 | Robert et al. | 524/518 |
| 8,461,269 | B2 | | 6/2013 | Varagniat et al. | 525/209 |
| 8,492,475 | B2 | | 7/2013 | Araujo Da Silva et al. | 524/552 |
| 8,631,846 | B2 | | 1/2014 | Custodero et al. | 152/502 |
| 8,883,929 | B2 | | 11/2014 | Gandon-Pain et al. | 525/326.5 |
| 9,010,393 | B2 | | 4/2015 | Araujo Da Silva et al. | C08K 5/5465 |
| 2001/0036991 | A1 | | 11/2001 | Robert et al. | 524/492 |
| 2002/0183436 | A1 | | 12/2002 | Robert et al. | 524/492 |
| 2004/0051210 | A1 | | 3/2004 | Tardivat et al. | 264/349 |
| 2004/0132880 | A1 | | 7/2004 | Durel et al. | 524/262 |
| 2005/0004297 | A1 | | 1/2005 | Durel et al. | 524/493 |
| 2005/0016650 | A1 | | 1/2005 | Durel et al. | 152/209.1 |
| 2005/0016651 | A1 | | 1/2005 | Durel et al. | 152/209.1 |
| 2006/0089445 | A1 | | 4/2006 | Gandon-Pain | 524/492 |

(Continued)

FOREIGN PATENT DOCUMENTS

| EP | 1 127 909 | A1 | 8/2001 |
| FR | 2 740 778 | A1 | 5/1997 |
| FR | 2 765 882 | A1 | 1/1999 |
| FR | 2 866 028 | A1 | 8/2005 |

(Continued)

OTHER PUBLICATIONS

U.S. Appl. No. 15/105,966, filed Dec. 19, 2014.
P.S. Tucker, et al., "Thermal, Mechanical, and Morphological Analyses of Poly(2,6-dimethyl-1,4-phenylene oxide)/Styrene-Butadiene-Styrene Blends", Macromolecules 21, 1678-1685 (1988).

*Primary Examiner* — Richard A Huhn
(74) *Attorney, Agent, or Firm* — Fitzpatrick, Cella, Harper & Scinto

(57) ABSTRACT

A rubber composition is based on at least one predominant vinylaromatic diene elastomer, a reinforcing filler, a cross-linking system and a thermoplastic resin comprising optionally substituted polyphenylene ether units, said resin having a compatibility with said vinylaromatic diene elastomer such that a mixture of said vinylaromatic diene elastomer and said resin creates a composition having less than 10% of its volume in the form of particles greater than 2 micrometres in size. The rubber composition may be used in semi-finished tire articles and tires.

46 Claims, No Drawings

(56) References Cited

U.S. PATENT DOCUMENTS

| | | |
|---|---|---|
| 2008/0009564 A1 | 1/2008 | Robert et al. .................. 523/351 |
| 2008/0132644 A1 | 6/2008 | Lapra et al. ................... 525/105 |
| 2008/0156404 A1 | 7/2008 | Brunelet et al. ........... 152/209.1 |
| 2009/0186961 A1 | 7/2009 | Araujo Da Silva et al. . 523/150 |
| 2009/0234066 A1 | 9/2009 | Araujo Da Silva et al. . 524/571 |
| 2009/0270558 A1 | 10/2009 | Gandon-pain et al. ....... 525/190 |
| 2009/0292063 A1 | 11/2009 | Robert et al. .................. 524/518 |
| 2010/0022714 A1 | 1/2010 | Varagniat et al. ............. 525/209 |
| 2010/0204359 A1 | 8/2010 | Robert et al. .................. 523/157 |
| 2011/0021702 A1 | 1/2011 | Gandon-Pain et al. ......... 525/55 |
| 2011/0152458 A1 | 6/2011 | Araujo Da Silva et al. . 525/102 |
| 2012/0208948 A1 | 8/2012 | Gandon-Pain et al. ...... 524/521 |
| 2012/0285597 A1 | 11/2012 | Abad et al. .................... 152/450 |
| 2013/0116376 A1* | 5/2013 | Custodero .................. C08L 9/00 524/526 |
| 2014/0044964 A1 | 2/2014 | Abad et al. .................... 428/378 |
| 2014/0045983 A1 | 2/2014 | Abad et al. .................... 524/440 |
| 2014/0051312 A1 | 2/2014 | Abad et al. .................... 442/149 |
| 2014/0083589 A1 | 3/2014 | Abad et al. ............... B60C 1/00 |
| 2015/0004413 A1 | 1/2015 | Abad et al. ........... B60C 9/0007 |
| 2015/0030851 A1 | 1/2015 | Abad et al. ........... B60C 9/0007 |
| 2016/0319115 A1 | 11/2016 | Abad ........................ C08L 9/06 |

FOREIGN PATENT DOCUMENTS

| | | |
|---|---|---|
| FR | 2 877 348 A1 | 5/2006 |
| FR | 2 889 538 A1 | 2/2007 |
| JP | 2004-238547 A | 8/2004 |
| WO | 97/36724 A2 | 10/1997 |
| WO | 99/16600 A1 | 4/1999 |
| WO | 01/92402 A1 | 12/2001 |
| WO | 02/30939 A1 | 4/2002 |
| WO | 02/31041 A1 | 4/2002 |
| WO | 03/002648 A1 | 1/2003 |
| WO | 03/002649 A1 | 1/2003 |
| WO | 03/016387 A1 | 2/2003 |
| WO | 2004/096865 A2 | 11/2004 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2011/161222 A1 | 12/2011 |
| WO | WO 2011161222 A1 * | 12/2011 ................ C08L 9/00 |
| WO | 02/083782 A1 | 10/2012 |
| WO | 2012/152688 A1 | 11/2012 |

* cited by examiner

RUBBER COMPOSITION COMPRISING A POLYPHENYLENE ETHER RESIN AS PLASTICIZER

FIELD OF THE INVENTION

The present invention relates to rubber compositions, especially intended for the manufacture of tyres or semi-finished products for tyres, in particular rubber compositions for tyre treads having a great ease of manufacture of the mixtures and good wear resistance of the tyre.

RELATED ART

Tyres are subjected to numerous stresses during the use thereof. Tyre treads especially must respond to a large number of often conflicting technical requirements, including high wear resistance and good dry and wet grip. The mixtures for these tyres must also have good processability, that is to say they must be easy to manufacture.

It is known practice to use elastomers combined with reinforcing fillers and plasticizing agents in tyre compositions. Conventionally, these plasticizing agents may be plasticizing oils or plasticizing resins, such as described in numerous documents, for example in patent applications FR 2 866 028, FR 2 877 348 or FR 2 889 538, describing especially the use of thermoplastic resins as plasticizing resins.

Moreover, Japanese document JP 2004-238547 describes a composition comprising micrometre-sized particles (approximately 10 μm or 45 μm) of a polyphenylene ether resin which make it possible to increase the stiffness of the compositions, with an increase in the hysteresis of the compositions which is deemed acceptable. In this document, the polyphenylene ether resin is used in the form of micrometric particles (approximately 10 μm or 45 μm) and not in the form of a compatible plasticizer, dispersed and intimately mixed with the elastomer matrix of the composition.

At present, the applicants have discovered during their research that a thermoplastic resin based on optionally substituted polyphenylene ether units may advantageously be used as plasticizing resin in a composition in which the predominant elastomer is a vinylaromatic diene elastomer. The use of a plasticizing resin makes it possible surprisingly to improve the performance compromise between ease of manufacturing the mixtures, and tyre grip. Moreover, the use of these thermoplastic resins based on optionally substituted polyphenylene ether units makes it possible to reduce the amount of resin compared to conventional thermoplastic plasticizing resins, which makes possible a reduction in the green tack of the compositions which is linked to the use of these resins, and therefore facilitates the manufacture of tyres comprising these compositions.

BRIEF DESCRIPTION OF EMBODIMENTS OF THE INVENTION

Consequently, a first subject of the invention relates to a rubber composition based on at least one predominant vinylaromatic diene elastomer, a reinforcing filler, a cross-linking system and a thermoplastic resin comprising optionally substituted polyphenylene ether units, said resin having a compatibility with said vinylaromatic diene elastomer such that a mixture of said vinylaromatic diene elastomer and said resin creates a composition having less than 10% of its volume in the form of particles greater than 2 micrometres in size.

Preferably, the invention relates to a composition as defined above, in which said resin has a compatibility with said vinylaromatic diene elastomer such that a mixture of said vinylaromatic diene elastomer and said resin creates a composition having less than 5% of its volume in the form of particles greater than 2 micrometres in size; more preferably, the compatibility with said vinylaromatic diene elastomer is such that a mixture of said vinylaromatic diene elastomer and said resin creates a composition having less than 2% of its volume in the form of particles greater than 2 micrometres in size.

Also preferably, the invention relates to a composition as defined above, in which said resin has a compatibility with said vinylaromatic diene elastomer such that the glass transition temperature Tg of a mixture of said vinylaromatic diene elastomer and said resin is increased by more than 5° C., preferably by more than 10° C. for 25 parts by weight per hundred parts by weight of elastomer (phr) of said resin, compared to the Tg of said vinylaromatic diene elastomer alone. More preferably, the compatibility with the vinylaromatic diene elastomer is such that the Tg of a mixture of said vinylaromatic diene elastomer and said resin is increased by more than 12° C. for 25 phr of said resin, compared to the Tg of said vinylaromatic diene elastomer alone.

Preferably, the invention relates to a composition as defined above, in which the vinylaromatic diene elastomer is selected from the group consisting of butadiene/styrene copolymers, isoprene/styrene copolymers and butadiene/isoprene/styrene copolymers and mixtures of these elastomers, and preferably from the group consisting of butadiene/styrene copolymers and mixtures of the latter. Preferably, the vinylaromatic diene elastomer has a vinylaromatic content of greater than 10%, preferably of between 15% and 60%, more preferably between 20% and 50%, very preferably between 30% and 50% and even more preferably between 35% and 50%. Also preferably, the content of vinylaromatic diene elastomer is within a range extending from 70 to 100 phr (parts by weight per hundred parts of elastomer) and more preferably from 85 to 100 phr.

Preferably, the invention relates to a composition as defined above, in which the thermoplastic resin based on optionally substituted polyphenylene ether units has a glass transition temperature (Tg), measured by DSC according to standard ASTM D3418, 1999, within a range extending from 0 to 215° C., preferably from 5 to 200° C. and more preferably from 5 to 185° C.

Preferably, the invention relates to a composition as defined above, in which the thermoplastic resin based on optionally substituted polyphenylene ether units is a compound which predominantly comprises polyphenylene units of general formula (I):

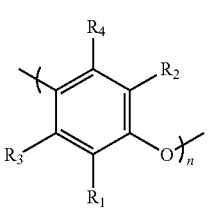

in which:
$R_1$, $R_2$, $R_3$ and $R_4$ represent, independently of one another, identical or different groups selected from hydrogen, hydroxyl, alkoxy, halogen, amino, alkylamino or dialkylamino groups or hydrocarbon-based groups comprising at least 2 carbon atoms, optionally interrupted by heteroatoms and optionally substituted; $R_1$ and $R_3$ on the one hand, and $R_2$ and $R_4$ on the other hand, possibly forming, together with the carbon atoms to which they are attached, one or more rings fused to the benzene ring of the compound of formula (I), n is an integer within a range extending from 3 to 300.

Preferably, the invention relates to a composition as defined above, in which the thermoplastic resin based on optionally substituted polyphenylene ether units is a compound predominantly comprising polyphenylene units of general formula (I) in which $R_1$, $R_2$, $R_3$ and $R_4$ represent, independently of one another, identical or different groups selected from:

hydrogen, hydroxyl, alkoxy, halogen, amino, alkylamino or dialkylamino groups, linear, branched or cyclic alkyl groups, comprising from 1 to 25 carbon atoms (preferably from 2 to 18), optionally interrupted by heteroatoms selected from nitrogen, oxygen and sulphur and optionally substituted by hydroxyl, alkoxy, amino, alkylamino, dialkylamino or halogen groups, aryl groups comprising from 6 to 18 carbon atoms (preferably from 6 to 12), optionally substituted by hydroxyl, alkoxy, amino, alkylamino, dialkylamino, alkyl or halogen groups.

Preferably, the invention relates to a composition as defined above, in which the thermoplastic resin based on optionally substituted polyphenylene ether units is a compound predominantly comprising polyphenylene units of general formula (I) in which $R_1$, $R_2$, $R_3$ and $R_4$ represent, independently of one another, identical or different groups selected from:

hydrogen, hydroxyl, alkoxy comprising from 1 to 6 carbon atoms, halogen, amino, alkylamino comprising from 1 to 6 carbon atoms, or dialkylamino comprising from 2 to 12 carbon atoms groups, linear, branched or cyclic alkyl groups, comprising from 1 to 12 carbon atoms (preferably from 2 to 6), optionally interrupted by heteroatoms and optionally substituted by hydroxyl, alkoxy comprising from 1 to 6 carbon atoms, amino, alkylamino comprising from 1 to 6 carbon atoms, dialkylamino comprising from 2 to 12 carbon atoms, or halogen groups, aryl groups comprising from 6 to 18 carbon atoms (preferably from 6 to 12), optionally substituted by hydroxyl, alkoxy comprising from 1 to 6 atoms, amino, alkylamino comprising from 1 to 6 atoms, dialkylamino comprising from 2 to 12 carbon atoms, alkyl comprising from 1 to 12 carbon atoms, or halogen groups.

Preferably, the invention relates to a composition as defined above, in which $R_1$ and $R_2$ represent an alkyl group and in particular a methyl group, and $R_3$ and $R_4$ represent hydrogen atoms.

More preferably, the invention relates to a composition as defined above, in which the thermoplastic resin based on optionally substituted polyphenylene ether units is a compound which predominantly comprises polyphenylene units of general formula (I) in which n is an integer within a range extending from 3 to 50, preferably from 5 to 30 and more preferably from 6 to 20.

Preferably, the invention relates to a composition as defined above, in which the thermoplastic resin based on optionally substituted polyphenylene ether units is a compound which comprises more than 80% by weight, preferably more than 95% by weight, of polyphenylene units of general formula (I).

Preferably, the invention relates to a composition as defined above, in which the content of said thermoplastic resin based on optionally substituted polyphenylene ether units is within a range extending from 1 to 90 phr, preferably from 2 to 80 phr, more preferably from 3 to 60 phr and better still from 5 to 60 phr.

Preferably, the invention relates to a composition as defined above, in which the reinforcing filler comprises carbon black and/or silica.

Also preferably, the invention relates to a composition as defined above, in which the reinforcing filler represents between 20 and 250 phr, more preferably between 30 and 180 phr.

Preferably, the invention relates to a composition as defined above, in which the reinforcing filler predominantly comprises carbon black. Preferably, the carbon black represents from 40 to 150 phr, preferably from 50 to 120 phr.

Alternatively and also preferably, the invention relates to a composition as defined above, in which the reinforcing filler predominantly comprises silica. Preferably, the silica represents from 40 to 150 phr, preferably from 50 to 120 phr.

Another subject of the invention is finished or semi-finished rubber articles comprising a rubber composition in accordance with the invention.

Another subject of the invention is tyres comprising a rubber composition in accordance with the invention, and especially tyres in which the tread comprises a rubber composition according to the invention.

The tyres in accordance with the invention are especially intended for passenger vehicles as well as for two-wheel vehicles (motorcycles, bicycles), industrial vehicles chosen from vans, "heavy-duty" vehicles—i.e. underground, bus, heavy road transport vehicles (lorries, tractors, trailers), off-road vehicles, heavy agricultural vehicles or earthmoving equipment, aircraft, and other transportation or handling vehicles.

DETAILED DESCRIPTION OF THE INVENTION

The invention and its advantages will be readily understood in the light of the description and the exemplary embodiments that follow.

I. Tests

The rubber compositions are characterized, before and after curing, as indicated below.

I.1. Dynamic Properties after Curing

The dynamic properties G* are measured on a viscosity analyser (Metravib VA4000) according to standard ASTM D 5992-96. The response is recorded of a sample of vulcanized composition (that is to say cured until a conversion rate of at least 90% is achieved) (cylindrical test specimen with a thickness of 2 mm and a cross section of 78.5 $mm^2$), subjected to a simple alternating sinusoidal shear stress, at a frequency of 10 Hz.

A temperature sweep is carried out at a constant temperature rise rate of +1.5° C./min with an imposed peak-to-peak shear stress of 0.7 MPa. The test specimen is subjected to sinusoidal shear stress at 10 Hz symmetrically about its equilibrium position. The results utilized are the complex dynamic shear modulus (G*), and the viscous component of the shear modulus (G"), denoted G"(T).

The glass transition temperature (denoted Tg) according to the invention corresponds to the temperature at which the maximum observed G" is observed during the temperature sweep. Thus, in the present description, unless expressly indicated otherwise, Tg is defined as the temperature at which the maximum G" is observed (G" representing, in a known way, the viscous component of the shear modulus) during the temperature sweep of a crosslinked sample subjected to imposed sinusoidal stress of 0.7 MPa at a frequency of 10 Hz. As indicated above, this Tg is measured during the measurement of dynamic properties, on a viscosity analyser (Metravib VA4000) according to standard ASTM D 5992-96. The sample for this measurement of Tg is crosslinked with sulphur at a content of approximately 1.5 phr and with N-cyclohexylbenzothiazolesulphenamide (CBS) at a content of approximately 2 phr.

I.2. Rheometry

The measurements are carried out at 150° C. with an oscillating disc rheometer, according to standard DIN 53529—part 3 (June 1983). The change in the rheometric torque, Δtorque, as a function of time describes the change in the stiffening of the composition as a result of the vulcanization reaction. The measurements are processed according to standard DIN 53529—Part 2 (March 1983): To is the induction period, that is to say the time necessary for the start of the vulcanization reaction; Tα (for example T99) is the time necessary to achieve a conversion of α %, that is to say α % (for example 99%) of the difference between the minimum and maximum torques. The conversion rate constant, denoted K (expressed in $min^{-1}$), which is first order, calculated between 30% and 80% conversion, which makes it possible to assess the vulcanization kinetics, is also measured.

I.3. Measurement of Particle Content

The measurements are carried out on a transmission optical microscope (TOM) on an Olympus device with reference BX-51. The observations are carried out in "bright field" mode with "40 times" magnification (objective lens ×40-additional magnification×1camera ring magnification× 1). The images are obtained in black and white by an Olympus DP-50 capturing camera. For this magnification, the field of observation corresponding to an image is 160 μm×120 μm. In order to cover a significant surface area, the measurements of particle surface content are carried out on at least 10 images. The samples observed are obtained using a cryomicrotome at −60° C. with a guideline cutting size of 2 μm.

Within the context of the present application, when reference is made to the compatibility of the PPE resin and the predominant vinylaromatic diene elastomer, "compatible" is intended to mean that this PPE resin does not form particles in the composition, that is to say that, in a mixture of the PPE resin and the vinylaromatic diene elastomer, a composition having less than 10% of its volume in the form of particles greater than 2 micrometres (μm) in size will be observed. More preferably, in a mixture of the PPE resin and the vinylaromatic diene elastomer, a composition having less than 5%, and preferably less than 2%, of its volume in the form of particles greater than 2 micrometres (μm) in size will be observed. This observation of particle content and size of particles may be carried out using the TOM as described above.

A composition in which less than 10% of said resin is in the form of particles greater than 2 micrometres in size corresponds to a composition in which, if 10 contiguous images are observed on 2 μm sections under the TOM as described above, on average less than 10% of the observed surface corresponding to particles greater than 2 μm in size will be found.

II. Conditions for the Implementation of the Invention

The rubber composition according to the invention is based on at least one predominant vinylaromatic diene elastomer, a reinforcing filler, a crosslinking system and a thermoplastic resin comprising optionally substituted polyphenylene ether units, said resin having a compatibility with said vinylaromatic diene elastomer such that a mixture of said vinylaromatic diene elastomer and said resin creates a composition having less than 10% of its volume in the form of particles greater than 2 micrometres in size.

The expression composition "based on" should be understood as meaning a composition comprising the mixture and/or the reaction product of the various constituents used, some of these base constituents being capable of reacting or intended to react with one another, at least in part, during the various phases of manufacturing the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant within the meaning of the present invention and, in a system comprising two elastomers, the predominant elastomer represents more than half of the weight of the elastomers.

II.1. Elastomers

The rubber composition according to the invention comprises a predominant vinylaromatic diene elastomer.

The term "diene" elastomer or rubber should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These definitions being given, the term "vinylaromatic diene elastomer" more particularly means any copolymer obtained by copolymerization of one or more conjugated dienes with one another or with one or more vinylaromatic compounds having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene.

The following, for example, are suitable as vinylaromatic compounds: styrene, α-methylstyrene, ortho-, meta- or paramethylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure, which depends on the polymerization conditions used, especially on the presence or absence of a modifying and/or randomizing agent and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalization agent. Mention may be made, for example, for coupling to carbon black, of functional groups comprising a C—Sn bond or aminated functional groups, such as benzophenone, for example; mention may be made, for example, for coupling to a reinforcing inorganic filler, such as silica, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of vinylaromatic diene elastomers (such as SBR) of the epoxidized type.

Preferably, the vinylaromatic diene elastomer of the composition in accordance with the invention has a vinylaromatic content of greater than 10%, preferably of between 15% and 60%, more preferably between 20% and 50%, very preferably between 30% and 50% and even more preferably between 35% and 50%. More preferably, the vinylaromatic diene elastomer of the composition in accordance with the invention is a styrene diene elastomer (that is to say that the vinylaromatic part is a styrene part) with a styrene content of greater than 10%, preferably of between 15% and 50%, more preferably between 20% and 50%, very preferably between 30% and 50% and even more preferably between 35% and 50%.

Alternatively and also preferably, the vinylaromatic diene elastomer of the composition in accordance with the invention has a vinylaromatic content of between 10% and 30%, preferably between 12% and 28% and more preferably between 14% and 20%. More preferably, the vinylaromatic diene elastomer of the composition in accordance with the invention is a styrene diene elastomer (that is to say that the vinylaromatic part is a styrene part) with a styrene content of between 10% and 30%, preferably between 12% and 28% and more preferably between 14% and 20%.

Preferably, the vinylaromatic diene elastomer of the composition in accordance with the invention is selected with preference from the group of highly unsaturated styrene diene elastomers consisting of styrene copolymers of butadiene, styrene copolymers of isoprene and mixtures of these elastomers. Such copolymers are more preferably selected from the group consisting of butadiene/styrene copolymers (SBR), isoprene/styrene copolymers (SIR) and isoprene/butadiene/styrene copolymers (SBIR).

The following are especially suitable: butadiene/styrene copolymers (SBR) and in particular those with a Tg (glass transition temperature), measured by DSC according to standard ASTM D3418, 1999, of between 20° C. and −70° C. and more particularly between 0° C. and −50° C., a styrene content of between 10% and 60% by weight and more particularly between 20% and 50%, a content (mol %) of -1,2 bonds in the butadiene part of between 4% and 75%, and a content (mol %) of trans-1,4 bonds of between 10% and 80%.

The following are also suitable: isoprene/styrene copolymers (SIR) and especially those having a styrene content of between 15% and 60% by weight and more particularly between 20% and 50%, and a Tg, measured by DSC according to standard ASTM D3418, 1999, of between 25° C. and −50° C.

In the case of butadiene/styrene/isoprene copolymers (SBIR), those having a styrene content of between 15% and 60% by weight and more particularly of between 20% and 50%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2- plus 3,4-units of the isoprene part of between 5% and 70% and a content (mol %) of trans-1,4-units of the isoprene part of between 10% and 50%, and more generally any butadiene/styrene/isoprene copolymer having a Tg, measured by DSC according to standard ASTM D3418, 1999, of between 20° C. and −60° C., are especially suitable.

Very preferably, the vinylaromatic diene elastomer of the composition in accordance with the invention is an SBR. In a known way, SBR may be prepared as emulsion (ESBR) or prepared as solution (SSBR). In the case of an SBR elastomer (ESBR or SSBR), an SBR having an average styrene content, for example of between 25% and 50% by weight, preferably between 35% and 50% by weight, is especially used.

The compositions of the invention may contain a single vinylaromatic diene elastomer or a mixture of several vinylaromatic diene elastomers, with the vinylaromatic diene elastomers(s), always predominant, being able to be used in combination with other elastomers known to those skilled in the art, such as for example a natural rubber (NR) or a polybutadiene (BR).

The content of vinylaromatic diene elastomer is within a range extending from 70 to 100 phr, more preferably from 85 to 100 phr, and very preferably this content is 100 phr, that is to say that there are only vinylaromatic diene elastomers in the composition.

II.2. Reinforcing Filler

Use may be made of any type of reinforcing filler known for its abilities to reinforce a rubber composition which can be used for the manufacture of tyres, for example an organic filler, such as carbon black, a reinforcing inorganic filler, such as silica, or else a blend of these two types of filler, in particular a blend of carbon black and silica.

All carbon blacks, especially blacks of the HAF, ISAF, SAF type, conventionally used in tyres (blacks referred to as tyre grade blacks) are suitable as carbon black. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, according to the intended applications, the blacks of higher series (for example N660, N683, N772). The carbon blacks might, for example, be already incorporated in an isoprene elastomer in the form of a masterbatch (see, for example, application WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

"Reinforcing inorganic filler" should be understood, in the present application, by definition, as meaning any inorganic or mineral filler, (irrespective of its colour and its origin: natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, reinforcing inorganic filler is also intended to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica having a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

The reinforcing inorganic filler used, in particular if it is silica, preferably has a BET surface area of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 160 phr, the optimum being, in a known way, different depending on the specific applications targeted: the level of reinforcement expected for a bicycle tyre, for example, is, of course, less than that required for a tyre capable of running at high speed in a sustained manner, for example a motorcycle tyre, a tyre for a passenger vehicle or a tyre for a utility vehicle, such as a heavy-duty vehicle.

According to a first preferred embodiment of the invention, carbon black is used as predominant reinforcing filler, at between 60 and 160 phr and more preferably between 70 and 150 phr.

According to another preferred embodiment of the invention, use is made of silica as predominant reinforcing filler at between 60 and 160 phr, more preferably between 70 and 150 phr, and optionally of carbon black; the carbon black, when it is present, is preferably used at a content of less than 20 phr, more preferably of less than 10 phr (for example between 0.1 and 5 phr).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is especially made of silane polysulphides, referred to as "symmetrical" or "asymmetrical" depending on their particular structure, as described for example in applications WO 03/002648 (or US 2005/016651) and WO 03/002649 (or US 2005/016650).

In particular, without the definition below being limiting, silane polysulphides referred to as "symmetrical", corresponding to the following general formula (II), are suitable:

Z-A-Sx-A-Z, in which:

x is an integer from 2 to 8 (preferably from 2 to 5);

A is a divalent hydrocarbon-based radical (preferably $C_1$-$C_{18}$ alkylene groups or $C_6$-$C_{12}$ arylene groups, more particularly $C_1$-$C_{10}$ alkylenes, especially $C_1$-$C_4$ alkylenes, in particular propylene);

Z corresponds to one of the formulae below:

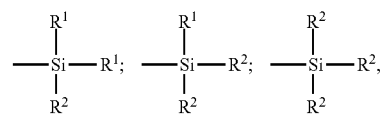

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, especially $C_1$-$C_4$ alkyl groups, more particularly methyl and/or ethyl).

the $R^2$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxys and $C_5$-$C_8$ cycloalkoxys, more preferably still a group chosen from $C_1$-$C_4$ alkoxys, in particular methoxy and ethoxy).

In the case of a mixture of alkoxysilane polysulphides corresponding to the above formula, especially customary commercially available mixtures, the mean value of the "x" indices is a fractional number preferably of between 2 and 5, more preferably close to 4. However, the invention may also advantageously be carried out, for example, with alkoxysilane disulphides (x=2).

Mention will more particularly be made, as examples of silane polysulphides, of bis(($C_1$-$C_4$)alkoxy($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$) alkoxydi($C_1$-$C_4$)alkylsilylpropyl) polysulphides (in particular disulphides, trisulphides or tetrasulphides), more particularly bis(monoethoxydimethylsilylpropyl) tetrasulphide, such as described in patent application WO 02/083782 (or US 2004/132880).

Mention will in particular be made, as coupling agent other than alkoxysilane polysulphide, of bifunctional POSs (polyorganosiloxanes), or else of hydroxysilane polysulphides ($R^2$=OH in the above formula), such as described in patent applications WO 02/30939 (or U.S. Pat. No. 6,774, 255) and WO 02/31041 (or US 2004/051210), or else of silanes or POSs bearing azodicarbonyl functional groups, such as described, for example, in patent applications WO 2006/125532, WO 2006/125533 and WO 2006/125534.

In the rubber compositions in accordance with the invention, the content of coupling agent is preferably between 4 and 16 phr, more preferably between 5 and 15 phr.

Those skilled in the art will understand that, as filler equivalent to the reinforcing inorganic filler described in the present section, a reinforcing filler of another nature, in particular organic nature, could be used provided that this reinforcing filler is covered with an inorganic layer, such as silica, or else comprises functional sites, in particular hydroxyl sites, at its surface that require the use of a coupling agent in order to form the bond between the filler and the elastomer.

II.3. PPE Resin

The composition according to the invention comprises a thermoplastic resin based on optionally substituted polyphenylene ether units (abbreviated to "PPE resin"). This type of compound is described for example in the encyclopaedia "Ullmann's Encyclopedia of Industrial Chemistry" published by VCH, vol. A 21, pages 605-614, 5$^{th}$ edition, 1992.

The PPE resin which is useful for the purposes of the invention preferably has a glass transition temperature (Tg), measured by DSC according to standard ASTM D3418, 1999, within a range extending from 0 to 215° C., preferably from 5 to 200° C. and more preferably from 5 to 185° C. Below 0° C. the PPE resin does not enable a sufficient shift of the Tg in the composition which comprises it and above 215° C. manufacturing problems, especially in terms of obtaining a homogeneous mixture, may be encountered.

Preferably, the PPE resin is a compound which predominantly comprises polyphenylene units of general formula (I):

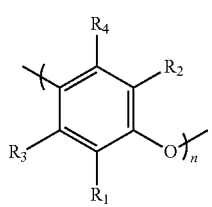

(I)

in which:

R$_1$, R$_2$, R$_3$ and R$_4$ represent, independently of one another, identical or different groups selected from hydrogen; hydroxyl, alkoxy, halogen, amino, alkylamino or dialkylamino groups; hydrocarbon-based groups comprising at least 2 carbon atoms, optionally interrupted by heteroatoms and optionally substituted; R$_1$ and R$_3$ on the one hand, and R$_2$ and R$_4$ on the other hand, possibly forming, together with the carbon atoms to which they are attached, one or more rings fused to the benzene ring of the compound of formula (I), n is an integer within a range extending from 3 to 300.

Preferably, R$_1$, R$_2$, R$_3$ and R$_4$ represent, independently of one another, identical or different groups selected from:
hydrogen,
hydroxyl, alkoxy, halogen, amino, alkylamino or dialkylamino groups,
linear, branched or cyclic alkyl groups, comprising from 1 to 25 carbon atoms (preferably from 2 to 18), optionally interrupted by heteroatoms selected from nitrogen, oxygen and sulphur and optionally substituted by hydroxyl, alkoxy, amino, alkylamino, dialkylamino or halogen groups,
aryl groups comprising from 6 to 18 carbon atoms (preferably from 6 to 12), optionally substituted by hydroxyl, alkoxy, amino, alkylamino, dialkylamino, alkyl or halogen groups.

More preferably, R$_1$, R$_2$, R$_3$ and R$_4$ represent, independently of one another, identical or different groups selected from:
hydrogen,
hydroxyl, alkoxy comprising from 1 to 6 carbon atoms, halogen, amino, alkylamino comprising from 1 to 6 carbon atoms, or dialkylamino comprising from 2 to 12 carbon atoms groups,
linear, branched or cyclic alkyl groups, comprising from 1 to 12 carbon atoms (preferably from 2 to 6), optionally interrupted by heteroatoms and optionally substituted by hydroxyl, alkoxy comprising from 1 to 6 carbon atoms, amino, alkylamino comprising from 1 to 6 carbon atoms, dialkylamino comprising from 2 to 12 carbon atoms, or halogen groups,
aryl groups comprising from 6 to 18 carbon atoms (preferably from 6 to 12), optionally substituted by hydroxyl, alkoxy comprising from 1 to 6 atoms, amino, alkylamino comprising from 1 to 6 atoms, dialkylamino comprising from 2 to 12 carbon atoms, alkyl comprising from 1 to 12 carbon atoms, or halogen groups.

Even more preferably, R$_1$ and R$_2$ represent an alkyl group and in particular a methyl group, and R$_3$ and R$_4$ represent hydrogen atoms. In this case, the PPE resin is a poly(2,6-dimethyl-1,4-phenylene ether).

Also preferably, n is an integer within a range extending from 3 to 50, more preferably from 5 to 30 and preferably from 6 to 20.

Preferably, the PPE resin is a compound comprising more than 80% by weight, and more preferably still more than 95% by weight of polyphenylene units of general formula (I).

Mention may be made, as examples, of poly(2,6-dimethyl-1,4-phenylene ether) and especially Noryl SA 120 from Sabic or Xyron S201 from Asahi Kasei.

In a known way, PPE resins have number-average molecular weights (M$_n$) which are variable, most often from 15 000 to 30 000 g/mol; in the case of high weights such as these, M$_n$ is measured in a way known to those skilled in the art by SEC (also referred to as GPC, as in reference U.S. Pat. No. 4,588,806, column 8). For the purposes of the invention, and especially for the requirements of compatibility expressed below, a PPE resin is preferred for the composition of the invention which has an M$_n$ weight which is lower than the weights usually encountered and especially lower than 6000 g/mol, preferably lower than 3500 g/mol and in particular an M$_n$ within a range extending from 700 to 2500 g/mol; these preferences apply to all vinylaromatic diene elastomers which may be used according to the invention, and in particular to those having a vinylaromatic content of between 20% and 50%, very preferably between 30% and 50% and even more preferably between 35% and 50%. The number-average molecular weight (M$_n$) of the PPEs with a weight lower than 6000 g/mol is measured by NMR, since the conventional SEC measurement is not precise enough. This NMR measurement is carried out in a way known to those skilled in the art, either by assaying the chain end functions or by assaying the polymerization initiators, as explained for example in "Application of NMR spectroscopy in molecular weight determination of polymers" by Subhash C. Shit and Sukumar Maiti in "European Polymer Journal" vol. 22, no. 12, pages 1001 to 1008 (1986).

According to a particularly preferred embodiment of the invention, when the vinylaromatic diene elastomer has a vinylaromatic content of between 10% and 30%, preferably of between 12% and 28%, more preferably between 14% and 20%, a PPE resin having a weight $M_n$ lower than the weights usually encountered and especially lower than 2200 g/mol, preferably lower than 2000 g/mol and in particular an $M_n$ within a range extending from 700 to 2000 g/mol is preferred for the composition of the invention.

Preferably, the value of the polydispersity index PDI (reminder: $PDI=M_w/M_n$, with $M_w$ the weight-average molecular weight and $M_n$ the number-average molecular weight) of the PPE resin is preferably less than or equal to 5, more preferably less than or equal to 3 and more preferably still less than or equal to 2.

The PPE resin which is useful for the requirements of the invention is compatible with the vinylaromatic diene elastomer of the composition.

As defined above, "compatible" is intended to mean that this PPE resin does not form particles in the composition, that is to say that a resin will be referred to as compatible if it gives, in a mixture with the vinylaromatic diene elastomer, a composition having less than 10%, preferably less than 5% and more preferably less than 2%, of its volume in the form of particles greater than 2 micrometres in size. The measurement method, using the TOM, is described above.

On a second, more preferred level, this PPE resin is compatible with the vinylaromatic diene elastomer such that it is capable of increasing the Tg of the elastomer; that is to say, it will enable the glass transition temperature Tg of a mixture of said vinylaromatic diene elastomer and said resin to increase by more than 5° C., preferably by more than 10° C., preferably by more than 12° C. for 25 parts by weight per hundred parts by weight of elastomer (phr) of said resin, compared to the Tg of said vinylaromatic diene elastomer alone.

The content of PPE resin in the composition is preferably within a range extending from 1 to 90 phr, more preferably from 2 to 80 phr, more preferably still from 3 to 60 phr and very preferably from 5 to 60 phr.

II.4. Crosslinking System

The crosslinking system can be a vulcanization system; it is preferably based on sulphur or sulphur donors and on primary vulcanization accelerator (preferably 0.5 to 10.0 phr of primary accelerator). Additional to this vulcanization system are optionally various known secondary vulcanization accelerators and/or vulcanization activators, such as zinc oxide (preferably for 0.5 to 10.0 phr), stearic acid or others. The sulphur is used at a preferred content of between 0.5 and 10 phr, more preferably of between 0.5 and 5.0 phr, for example between 0.5 and 3.0 phr when the invention is applied to a tyre tread.

Use may be made, as (primary or secondary) accelerator, of any compound capable of acting as accelerator of the vulcanization of diene elastomers in the presence of sulphur, especially accelerators of the thiazole type and their derivatives and accelerators of the thiuram and zinc dithiocarbamate types. These accelerators are more preferably selected from the group consisting of 2-mercaptobenzothiazole disulphide (abbreviated to "MBTS"), N-cyclohexyl-2-benzothiazolesulphenamide (abbreviated to "CBS"), N, N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI"), zinc dibenzyldithiocarbamate (abbreviated to "ZBEC") and the mixtures of these compounds. Preferably, use is made of a primary accelerator of the sulphenamide type.

II.5. Various Additives

The rubber compositions of the treads in accordance with the invention also comprise all or some of the usual additives generally used in elastomer compositions intended for the manufacture of treads, such as, for example, pigments, protection agents, such as antiozone waxes, chemical antiozonants, antioxidants, antifatigue agents, reinforcing resins or plasticizing agents. Preferably, this plasticizing agent is a solid hydrocarbon-based resin other than the resin described above (or plasticizing resin), an extending oil (or plasticizing oil) or a mixture of the two.

These compositions may also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

II.6. Preparation of the Rubber Compositions

The compositions used in the treads of the invention can be manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) to a lower temperature, typically of less than 110° C., for example between 40° C. and 100° C., during which finishing phase the crosslinking system is incorporated.

The process for preparing such compositions comprises, for example, the following steps:
  incorporating into the elastomers, especially the vinylaromatic diene elastomer, during a ("non-productive") first step, the reinforcing filler, the PPE resin and optional other ingredients of the composition with the exception of the crosslinking system, by thermomechanically kneading everything (for example once or several times) until a maximum temperature of between 110° C. and 190° C. is achieved;
  cooling the combined mixture to a temperature of less than 100° C.;
  subsequently incorporating, during a ("productive") second step, a crosslinking system;
  kneading everything to a maximum temperature of less than 110° C.

By way of example, the non-productive phase is carried out in a single thermomechanical step during which, firstly, all the necessary base constituents (elastomers, reinforcing filler, PPE resin and others) are introduced into an appropriate mixer, such as a standard internal mixer, followed secondly, for example after kneading for one to two minutes, by the other additives, optional additional agents for covering the filler or optional additional processing aids, with the exception of the crosslinking system. The total duration of kneading in this non-productive phase is preferably between 1 and 15 minutes. After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained can subsequently be calendered, for example in the form of a sheet or of a slab, especially for laboratory characterization, or else extruded, for example in order to form a rubber profiled element used in the manufacture of a tyre.

The invention relates to the tyres and the semi-finished products for tyres described above, rubber articles, both in the raw state (that is to say, before curing) and in the cured state (that is to say, after crosslinking or vulcanization).

II.7. Tyre of the Invention

The rubber composition according to the invention may be used in different parts of the tyre, in particular in the crown, the carcass, the area of the bead, the area of the sidewall and the tread (including especially the underlayer of the tread).

According to a preferred embodiment of the invention, the rubber composition described above may be used in the tyre as a stiff elastomer layer in at least one part of the tyre.

The term elastomer "layer" is understood to mean any three-dimensional component, made of rubber (or "elastomer", the two being regarded as synonyms) composition, having any shape and thickness, in particular sheet, strip or other component having any cross section, for example rectangular or triangular.

First of all, the elastomer layer may be used as tread underlayer positioned in the crown of the tyre between, on the one hand, the tread, i.e. the portion intended to come into contact with the road during running, and, on the other hand, the belt reinforcing the said crown. The thickness of this elastomer layer is preferably within a range extending from 0.5 to 10 mm, especially within a range from 1 to 5 mm.

According to another preferred embodiment of the invention, the rubber composition according to the invention may be used to form an elastomer layer positioned in the region of the area of the bead of the tyre, radially between the carcass ply, the bead wire and the turn-up of the carcass ply.

Another preferred embodiment of the invention can be the use of the composition according to the invention to form an elastomer layer positioned in the area of the sidewall of the tyre.

Alternatively, the composition of the invention may advantageously be used in the tread of the tyre.

III. Examples Of The Implementation Of The Invention

III.1. Preparation of the Compositions

The following tests are carried out in the following way: the vinylaromatic diene elastomer, the reinforcing filler and the PPE resin, and also the various other ingredients, with the exception of the vulcanization system, are successively introduced into an internal mixer (final degree of filling: approximately 70% by volume), the initial vessel temperature of which is approximately 60° C. Thermomechanical working (non-productive phase) is then carried out in one step, which lasts in total approximately from 3 to 4 min, until a maximum "dropping" temperature of 180° C. is reached.

The mixture thus obtained is recovered and cooled and then sulphur and an accelerator of sulphenamide type are incorporated on a mixer (homofinisher) at 30° C., everything being mixed (productive phase) for an appropriate time (for example between 5 and 12 min).

The compositions thus obtained are subsequently calendered, either in the form of slabs (thickness from 2 to 3 mm) or of thin sheets of rubber, for the measurement of their physical or mechanical properties, or extruded in the form of a profiled element.

III.2. Tests on Rubber Compositions

EXAMPLE 1

This test illustrates rubber compositions used in tyre treads. These compositions make it possible to increase the Tg of the mixture compared to a conventional rubber composition (comprising a conventional plasticizing resin). For this purpose, rubber compositions were prepared as indicated above.

Control compositions C1, C2 and C3 are compositions which are conventional for those skilled in the art, used to manufacture mixtures for tyre treads.

The compositions of the invention C4 to C6 contain a thermoplastic resin based on optionally substituted polyphenylene ether units (abbreviated to "PPE resin"), replacing the C5/C9-cut plasticizing resin customary for those skilled in the art which is used in controls C2 and C3. The formulations (in phr or parts by weight per hundred parts of elastomer) and their mechanical properties have been summarized in Tables 1 and 2 below.

TABLE 1

| | Composition | | | | | | | |
|---|---|---|---|---|---|---|---|---|
| | C1 | C2 | C3 | C4 | C5 | C6 | C7 | C8 |
| SBR (1) | 100 | 100 | 100 | 100 | 100 | 100 | 100 | 100 |
| Carbon black (2) | 60 | 75 | 85 | 75 | 85 | 85 | 75 | 85 |
| Plasticizing resin (3) | — | 25 | 50 | — | — | — | — | — |
| PPE Resin 1 (4) | — | — | — | 25 | 50 | — | — | — |
| PPE Resin 2 (5) | — | — | — | — | — | 50 | — | — |
| PPE Resin 3 (6) | — | — | — | — | — | — | 25 | 50 |
| ZnO (7) | 3 | 3 | 3 | 3 | 3 | 3 | 3 | 3 |
| Stearic acid (8) | 2 | 2 | 2 | 2 | 2 | 2 | 2 | 2 |
| 6PPD (9) | 2 | 2 | 2 | 2 | 2 | 2 | 2 | 2 |
| Sulphur | 1.4 | 1.4 | 1.4 | 1.4 | 1.4 | 1.4 | 1.4 | 1.4 |
| CBS (10) | 2.1 | 2.1 | 2.1 | 2.1 | 2.1 | 2.1 | 2.1 | 2.1 |

(1) SBR with 41% of styrene units and 24% of 1,2-units of the butadiene part (Tg, measured by DSC according to standard ASTM D3418, 1999, of −25° C.);

(2) ASTM grade N234 (Cabot);

(3) C5/C9 Resin, Escorez 2173 from Exxon;

(4) PPE Resin 1 Poly(2,6-dimethyl-1,4-phenylene ether): Noryl SA120 from Sabic, $M_n$ = 2350 g/mol;

(5) PPE Resin 2 Poly(2,6-dimethyl-1,4-phenylene ether): Xyron S201 A from Asahi Kasei, $M_n$ = 19 000 g/mol;

(6) PPE Resin 3 Poly(2,6-dimethyl-1,4-phenylene ether): Noryl SA90 from Sabic, $M_n$ = 1800 g/mol;

(7) Zinc oxide (industrial grade-Umicore);

(8) Stearin (Pristerene 4931 from Uniqema);

(9) N-(1,3-Dimethylbutyl)-N-phenyl-para-phenylenediamine: Santoflex 6-PPD from Flexsys;

(10) N-cyclohexylbenzothiazolesulphenamide (Santocure CBS from Flexsys).

TABLE 2

| | Composition | | | | | | | |
|---|---|---|---|---|---|---|---|---|
| | C1 | C2 | C3 | C4 | C5 | C6 | C7 | C8 |
| Tg | −17° C. | −10.5° C. | −6.5° C. | −1° C. | +8.5° C. | −12° C. | −2.8° C. | +12.7° C. |
| % vol particles >2 μm* | <2% | <2% | <2% | <2% | <2% | >10% | <2% | <2% |

*measurement carried out on SBR + PPE resin mixture

It is noted that replacing the customary resin with a PPE resin in the compositions of the invention C4 and C5 makes it possible to obtain an increase in the temperature corresponding to maximum G"(T), and hence an increase in the Tg of the mixture, compared to the respective control compositions C2 and C3, which is representative of the greater plasticizing effect of the PPE resin compared to that of conventional plasticizing resins. It is also noted that for composition C6, having more than 10% by volume of particles greater than 2 μm in size, this effect is not obtained.

For the compositions in accordance with the invention, by virtue of this greater plasticizing effect than conventional plasticizing resins, it is possible to reduce the content of resin used and also to reduce the green tack brought about by the plasticizing resins and thus facilitate the manufacture of mixtures.

EXAMPLES 2 AND 3

Examples 2 and 3 given below are supplementary illustrations of the invention, in rubber compositions in which the nature of the vinylaromatic diene elastomer and the nature of the filler vary. Example 2, like Example 1, shows compositions in which carbon black is the predominant filler, whereas Example 3 shows compositions in which silica is the predominant reinforcing filler.

EXAMPLE 2

In this example the vinylaromatic diene elastomer has a Tg of −48° C.

TABLE 3

| | Composition | | | | | | | |
|---|---|---|---|---|---|---|---|---|
| | C1 | C2 | C3 | C4 | C5 | C6 | C7 | C8 |
| SBR (1) | 100 | 100 | 100 | 100 | 100 | 100 | 100 | 100 |
| Carbon black (2) | 60 | 75 | 85 | 75 | 85 | 85 | 75 | 85 |
| Plasticizing resin (3) | — | 25 | 50 | — | — | — | — | — |
| PPE Resin 1 (4) | — | — | — | 25 | 50 | — | — | — |
| PPE Resin 2 (5) | — | — | — | — | — | 50 | — | — |
| PPE Resin 3 (6) | — | — | — | — | — | — | 25 | 50 |
| ZnO (7) | 3 | 3 | 3 | 3 | 3 | 3 | 3 | 3 |
| Stearic acid (8) | 2 | 2 | 2 | 2 | 2 | 2 | 2 | 2 |
| 6PPD (9) | 2 | 2 | 2 | 2 | 2 | 2 | 2 | 2 |
| Sulphur | 1.4 | 1.4 | 1.4 | 1.4 | 1.4 | 1.4 | 1.4 | 1.4 |
| CBS (10) | 2.1 | 2.1 | 2.1 | 2.1 | 2.1 | 2.1 | 2.1 | 2.1 |

(1) SBR with 26.5% of styrene units and 24% of 1,2-units of the butadiene part (Tg, measured by DSC according to standard ASTM D3418, 1999, of −48° C.);
(2) ASTM grade N234 (Cabot);
(3) C5/C9 Resin, Escorez 2173 from Exxon;
(4) PPE Resin 1 Poly(2,6-dimethyl-1,4-phenylene ether): Noryl SA120 from Sabic, $M_n$ = 2350 g/mol;
(5) PPE Resin 2 Poly(2,6-dimethyl-1,4-phenylene ether): Xyron S201 A from Asahi Kasei, $M_n$ = 19 000 g/mol;
(6) PPE Resin 3 Poly(2,6-dimethyl-1,4-phenylene ether): Noryl SA90 from Sabic, $M_n$ = 1800 g/mol;
(7) Zinc oxide (industrial grade-Umicore);
(8) Stearin (Pristerene 4931 from Uniqema);
(9) N-(1,3-Dimethylbutyl)-N-phenyl-para-phenylenediamine: Santoflex 6-PPD from Flexsys;
(10) N-cyclohexylbenzothiazolesulphenamide (Santocure CBS from Flexsys).

TABLE 4

| | Composition | | | | | | | |
|---|---|---|---|---|---|---|---|---|
| | C1 | C2 | C3 | C4 | C5 | C6 | C7 | C8 |
| Tg | −36.7° C. | −28.9° C. | −22.3° C. | −27.8° C. | −22.2° C. | −35.5° C. | −22.5° C. | −17.8° C. |
| % vol particles >2 μm* | <2% | <2% | <2% | <2% | <2% | >10% | <2% | <2% |

*measurement carried out on SBR + PPE resin mixture

EXAMPLE 3

In this example the vinylaromatic diene elastomer has a Tg of −25° C.

TABLE 5

| | Composition | | | | | | | |
|---|---|---|---|---|---|---|---|---|
| | C1 | C2 | C3 | C4 | C5 | C6 | C7 | C8 |
| SBR (1) | 100 | 100 | 100 | 100 | 100 | 100 | 100 | 100 |
| Silica (2) | 65 | 85 | 100 | 85 | 100 | 100 | 85 | 100 |
| Plasticizing resin (3) | — | 25 | 50 | — | — | — | — | — |
| PPE Resin 1 (4) | — | — | — | 25 | 50 | — | — | — |
| PPE Resin 2 (5) | — | — | — | — | — | 50 | — | — |
| PPE Resin 3 (6) | — | — | — | — | — | — | 25 | 50 |
| Silane (7) | 5 | 6.5 | 8 | 6.5 | 8 | 8 | 6.5 | 8 |

TABLE 5-continued

| | Composition | | | | | | | |
|---|---|---|---|---|---|---|---|---|
| | C1 | C2 | C3 | C4 | C5 | C6 | C7 | C8 |
| DPG (8) | 1 | 1.4 | 1.7 | 1.4 | 1.7 | 1.7 | 1.4 | 1.7 |
| ZnO (9) | 3 | 3 | 3 | 3 | 3 | 3 | 3 | 3 |
| Stearic acid (10) | 2 | 2 | 2 | 2 | 2 | 2 | 2 | 2 |
| 6PPD (11) | 2 | 2 | 2 | 2 | 2 | 2 | 2 | 2 |
| Sulphur | 1.4 | 1.4 | 1.4 | 1.4 | 1.4 | 1.4 | 1.4 | 1.4 |
| CBS (12) | 2.1 | 2.1 | 2.1 | 2.1 | 2.1 | 2.1 | 2.1 | 2.1 |

(1) SBR with 41% of styrene units and 24% of 1,2-units of the butadiene part (Tg, measured by DSC according to standard ASTM D3418, 1999, of −25° C.);
(2) Zeosil1165MP silica from Solvay with BET surface area of 160 m$^2$/g;
(3) C5/C9 Resin, Escorez 2173 from Exxon;
(4) PPE Resin 1 Poly(2,6-dimethyl-1,4-phenylene ether): Noryl SA120 from Sabic, M$_n$ = 2350 g/mol;
(5) PPE Resin 2 Poly(2,6-dimethyl-1,4-phenylene ether): Xyron S201 A from Asahi Kasei, M$_n$ = 19 000 g/mol;
(6) PPE Resin 3 Poly(2,6-dimethyl-1,4-phenylene ether): Noryl SA90 from Sabic, M$_n$ = 1800 g/mol;
(7) TESPT coupling agent: SI69 from Evonik;
(8) Diphenylguanidine: Perkacit DPG from Flexsys;
(9) Zinc oxide (industrial grade-Umicore);
(10) Stearin (Pristerene 4931 from Uniqema);
(11) N-(1,3-Dimethylbutyl)-N-phenyl-para-phenylenediamine: Santoflex 6-PPD from Flexsys;
(12) N-cyclohexylbenzothiazolesulphenamide (Santocure CBS from Flexsys).

TABLE 6

| | Composition | | | | | | | |
|---|---|---|---|---|---|---|---|---|
| | C1 | C2 | C3 | C4 | C5 | C6 | C7 | C8 |
| Tg | −18° C. | −12° C. | −7.9° C. | −5° C. | +4.3° C. | −14° C. | −2.8° C. | +8.3° C. |
| % vol particles >2 μm* | <2% | <2% | <2% | <2% | <2% | >10% | <2% | <2% |

*measurement carried out on SBR + PPE resin mixture

The invention claimed is:

1. A rubber composition based on:
   at least one predominant vinylaromatic diene elastomer;
   a reinforcing filler;
   a crosslinking system; and
   a thermoplastic resin comprising optionally substituted polyphenylene ether units,
   wherein said resin has a compatibility with said vinylaromatic diene elastomer such that a mixture of said vinylaromatic diene elastomer and said resin creates a composition having less than 10% of its volume in the form of particles greater than 2 micrometers in size.

2. The rubber composition according to claim 1, wherein said resin has a compatibility with said vinylaromatic diene elastomer such that a mixture of said vinylaromatic diene elastomer and said resin creates a composition having less than 5% of its volume in the form of particles greater than 2 micrometers in size.

3. The rubber composition according to claim 1, wherein said resin has a compatibility with said vinylaromatic diene elastomer such that a mixture of said vinylaromatic diene elastomer and said resin creates a composition having less than 2% of its volume in the form of particles greater than 2 micrometer in size.

4. The rubber composition according to claim 1, wherein said resin has a compatibility with said vinylaromatic diene elastomer such that the glass transition temperature Tg of a mixture of said vinylaromatic diene elastomer and said resin is increased by more than 5° C. for 25 parts by weight per hundred parts by weight of elastomer (phr) of said resin, compared to the Tg of said vinylaromatic diene elastomer alone.

5. The rubber composition according to claim 4, wherein said resin has a compatibility with said vinylaromatic diene elastomer such that the glass transition temperature Tg of a mixture of said vinylaromatic diene elastomer and said resin is increased by more than 10° C. for 25 parts by weight per hundred parts by weight of elastomer (phr) of said resin, compared to the Tg of said vinylaromatic diene elastomer alone.

6. The rubber composition according to claim 1, wherein said resin has a compatibility with the vinylaromatic diene elastomer such that the Tg of a mixture of said vinylaromatic diene elastomer and said resin is increased by more than 12° C. for 25 phr of said resin, compared to the Tg of said vinylaromatic diene elastomer alone.

7. The rubber composition according to claim 1, wherein the vinylaromatic diene elastomer is selected from the group consisting of butadiene/styrene copolymers, isoprene/styrene copolymers and butadiene/isoprene/styrene copolymers and mixtures thereof.

8. The rubber composition according to claim 7, wherein the vinylaromatic diene elastomer is selected from the group consisting of butadiene/styrene copolymers and mixtures thereof.

9. The rubber composition according to claim 1, wherein the vinylaromatic diene elastomer has a vinylaromatic content of greater than 10%.

10. The rubber composition according to claim 9, wherein the vinylaromatic diene elastomer has a vinylaromatic content of between 15% and 60%.

11. The rubber composition according to claim 10, wherein the vinylaromatic diene elastomer has a vinylaromatic content of between 20% and 50%.

12. The rubber composition according to claim 11, wherein the vinylaromatic diene elastomer has a vinylaromatic content of between 30% and 50%.

13. The rubber composition according to claim 12, wherein the vinylaromatic diene elastomer has a vinylaromatic content of between 35% and 50%.

14. The rubber composition according to claim 1, wherein the content of vinylaromatic diene elastomer is within a range extending from 70 to 100 phr (parts by weight per hundred parts of elastomer).

15. The rubber composition according to claim 14, wherein the content of vinylaromatic diene elastomer is within a range extending from 85 to 100 phr.

16. The rubber composition according to claim 1, wherein the thermoplastic resin based on optionally substituted polyphenylene ether units has a glass transition temperature Tg, measured by DSC according to standard ASTM D3418, 1999, within a range extending from 0 to 215° C.

17. The rubber composition according to claim 16, wherein the thermoplastic resin based on optionally substituted polyphenylene ether units has a glass transition temperature Tg, measured by DSC according to standard ASTM D3418, 1999, within a range extending from 5 to 200° C.

18. The rubber composition according to claim 17, wherein the thermoplastic resin based on optionally substituted polyphenylene ether units has a glass transition temperature Tg, measured by DSC according to standard ASTM D3418, 1999, within a range extending from 5 to 185° C.

19. The rubber composition according to claim 1, wherein the thermoplastic resin based on optionally substituted polyphenylene ether units is a compound which predominantly comprises polyphenylene units of general formula (I):

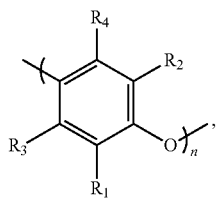

wherein $R_1$, $R_2$, $R_3$ and $R_4$ represent, independently of one another, identical or different groups selected from the group consisting of hydrogen, hydroxyl, alkoxy, halogen, amino, alkylamino groups, dialkylamino groups or hydrocarbon-based groups comprising at least 2 carbon atoms, optionally interrupted by heteroatoms and optionally substituted;

wherein $R_1$ and $R_3$ or $R_2$ and $R_4$ may form, together with the carbon atoms to which they are attached, one or more rings fused to the benzene ring of the compound of formula (I), and wherein n is an integer within a range extending from 3 to 300.

20. The rubber composition according to claim 19, wherein the thermoplastic resin based on optionally substituted polyphenylene ether units is a compound predominantly comprising polyphenylene units of general formula (I), wherein $R_1$, $R_2$, $R_3$ and $R_4$ represent, independently of one another, identical or different groups selected from the group consisting of hydrogen, hydroxyl, alkoxy, halogen, amino, alkylamino groups, dialkylamino groups, alkyl groups, and aryl groups, wherein the alkyl groups are linear, branched or cyclic alkyl groups, comprising from 1 to 25 carbon atoms, optionally interrupted by heteroatoms selected from the group consisting of nitrogen, oxygen and sulfur and optionally substituted by hydroxyl, alkoxy, amino, alkylamino, dialkylamino or halogen groups, and wherein the aryl groups comprise from 6 to 18 carbon atoms, optionally substituted by hydroxyl, alkoxy, amino, alkylamino, dialkylamino, alkyl or halogen groups.

21. The rubber composition according to claim 20, wherein the alkyl groups comprise from 2 to 18 carbon atoms and the aryl groups comprise from 6 to 12 carbon atoms.

22. The rubber composition according to claim 20, wherein the thermoplastic resin based on optionally substituted polyphenylene ether units is a compound predominantly comprising polyphenylene units of general formula (I), wherein $R_1$, $R_2$, $R_3$ and $R_4$ represent, independently of one another, identical or different groups selected from the group consisting of hydrogen, hydroxyl, alkoxy comprising from 1 to 6 carbon atoms, halogen, amino, alkylamino comprising from 1 to 6 carbon atoms, dialkylamino comprising from 2 to 12 carbon atoms groups, alkyl groups, and aryl groups, wherein the alkyl groups are linear, branched or cyclic alkyl groups, comprising from 1 to 12 carbon atoms, optionally interrupted by heteroatoms and optionally substituted by hydroxyl, alkoxy comprising from 1 to 6 carbon atoms, amino, alkylamino comprising from 1 to 6 carbon atoms, dialkylamino comprising from 2 to 12 carbon atoms, or halogen groups, and wherein the aryl groups comprise from 6 to 18 carbon atoms, optionally substituted by hydroxyl, alkoxy comprising from 1 to 6 atoms, amino, alkylamino comprising from 1 to 6 atoms, dialkylamino comprising from 2 to 12 carbon atoms, alkyl comprising from 1 to 12 carbon atoms, or halogen groups.

23. The rubber composition according to claim 22, wherein the alkyl groups comprise from 2 to 6 carbon atoms and the aryl groups comprise from 6 to 12 carbon atoms.

24. The rubber composition according to claim 19, wherein $R_1$ and $R_2$ each represent an alkyl group and $R_3$ and $R_4$ each represent a hydrogen atom.

25. The rubber composition according to claim 24, wherein $R_1$ and $R_2$ each represent a methyl group.

26. The rubber composition according to claim 19, wherein the thermoplastic resin based on optionally substituted polyphenylene ether units is a compound which predominantly comprises polyphenylene units of general formula (I), and wherein n is an integer within a range extending from 3 to 50.

27. The rubber composition according to claim 26, wherein n is an integer within a range extending from 5 to 30.

28. The rubber composition according to claim 27, wherein n is an integer within a range extending from 6 to 20.

29. The rubber composition according to claim 19, wherein the thermoplastic resin based on optionally substituted polyphenylene ether units is a compound which comprises more than 80% by weight of polyphenylene units of general formula (I).

30. The rubber composition according to claim 29, wherein the thermoplastic resin based on optionally substituted polyphenylene ether units is a compound which comprises more than 95% by weight of polyphenylene units of general formula (I).

31. The rubber composition according to claim 1, wherein the content of said thermoplastic resin based on optionally substituted polyphenylene ether units is within a range extending from 1 to 90 phr.

32. The rubber composition according to claim 31, wherein the content of said thermoplastic resin based on optionally substituted polyphenylene ether units is within a range extending from 2 to 80 phr.

33. The rubber composition according to claim 31, wherein the content of said thermoplastic resin based on optionally substituted polyphenylene ether units is within a range extending from 3 to 60 phr.

34. The rubber composition according to claim 31, wherein the content of said thermoplastic resin based on optionally substituted polyphenylene ether units is within a range extending from 5 to 60 phr.

35. The rubber composition according to claim 1, wherein the reinforcing filler comprises carbon black, silica, or a mixture thereof.

36. The rubber composition according to claim 1, wherein the reinforcing filler represents between 20 and 200 phr.

37. The rubber composition according to claim 36, wherein the reinforcing filler represents between 30 and 160 phr.

38. The rubber composition according to claim 1, wherein the reinforcing filler predominantly comprises carbon black.

39. The rubber composition according to claim 38, wherein the carbon black represents from 60 to 160 phr.

40. The rubber composition according to claim 39, wherein the carbon black represents from 70 to 150 phr.

41. The rubber composition according to claim 1, wherein the reinforcing filler predominantly comprises silica.

42. The rubber composition according to claim 41, wherein the silica represents from 60 to 160 phr.

43. The rubber composition according to claim 42, wherein the silica represents from 70 to 150 phr.

44. A finished or semi-finished rubber article comprising a rubber composition according to claim 1.

45. A tire comprising a rubber composition according to claim 1.

46. The tire according to claim 45, wherein the rubber composition comprises a tread.

* * * * *